(12) United States Patent
Graber et al.

(10) Patent No.: US 8,033,610 B2
(45) Date of Patent: Oct. 11, 2011

(54) BACKREST FOR A VEHICLE SEAT WITH AN UPPER BACKREST HAVING ADJUSTABLE INCLINATION

(75) Inventors: Ulrich Graber, Paunzhausen (DE);
Peter Nordberg, Unterfoehring (DE);
Juergen Ringer, Au (DE); Stanislav Jendrol, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 189 days.

(21) Appl. No.: 12/512,566

(22) Filed: Jul. 30, 2009

(65) Prior Publication Data
US 2010/0026066 A1 Feb. 4, 2010

Related U.S. Application Data

(63) Continuation of application No. PCT/EP2008/000242, filed on Jan. 15, 2008.

(30) Foreign Application Priority Data

Jan. 31, 2007 (DE) .................. 10 2007 004 767

(51) Int. Cl.
*B60N 2/02* (2006.01)
*B60N 2/48* (2006.01)
(52) U.S. Cl. ................. 297/408; 297/284.1; 297/354.11
(58) Field of Classification Search ............... 297/284.1, 297/284.3, 354.11, 408
See application file for complete search history.

(56) References Cited

U.S. PATENT DOCUMENTS

| 4,865,388 | A | * | 9/1989 | Nemoto ................. 297/408 X |
| 5,664,841 | A | * | 9/1997 | Dal Monte ................ 297/408 |
| 6,336,656 | B1 | * | 1/2002 | Romeo .................. 280/733 |
| 6,398,299 | B1 | | 6/2002 | Angerer et al. |
| 6,511,130 | B2 | * | 1/2003 | Dinkel et al. ............ 297/408 X |
| 6,550,856 | B1 | * | 4/2003 | Ganser et al. .......... 297/284.1 X |
| 6,688,697 | B2 | * | 2/2004 | Baumann et al. ......... 297/408 X |
| 6,805,411 | B2 | * | 10/2004 | Gramss et al. ................ 297/408 |
| 7,070,235 | B2 | * | 7/2006 | Schilling et al. ......... 297/216.12 |
| 7,273,232 | B2 | * | 9/2007 | Fontecchio et al. ........... 280/808 |
| 7,686,394 | B2 | * | 3/2010 | Nishikawa et al. .. 297/354.11 X |

FOREIGN PATENT DOCUMENTS

| DE | 197 54 311 A1 | 12/1998 |
| DE | 199 10 666 A1 | 9/2000 |
| DE | 199 52 560 A1 | 5/2001 |
| DE | 10 2004 060 816 A1 | 6/2006 |

(Continued)

OTHER PUBLICATIONS

German Search Report dated Aug. 24, 2007 with English translation (nine (9) pages).

(Continued)

*Primary Examiner* — Rodney B White
(74) *Attorney, Agent, or Firm* — Crowell & Moring LLP

(57) ABSTRACT

A backrest for a vehicle seat includes a backrest frame, which is surrounded by a cover and has an upper backrest with an adjustable inclination. An additional frame is hinged so as to be pivotable about a pivot axis to a side plate, the cover, or the backrest frame. The pivot axis is arranged in an upper region of the backrest, and the additional frame extends upwards from the pivot axis in the installed position of the backrest. The additional frame can be secured in different angular positions in relation to the backrest frame, and, thus, a variable gap forms between the additional cover of the additional frame and the cover of the backrest frame.

18 Claims, 5 Drawing Sheets

FOREIGN PATENT DOCUMENTS

| | | |
|---|---|---|
| EP | 1 095 815 A1 | 5/2001 |
| GB | 2 134 381 A | 8/1984 |
| JP | 06072207 A * | 3/1994 |
| JP | 06072214 A * | 3/1994 |
| JP | 06072215 A * | 3/1994 |
| JP | 06072216 A * | 3/1994 |
| JP | 06072218 A * | 3/1994 |
| JP | 06072219 A * | 3/1994 |
| JP | 06072220 A * | 3/1994 |

OTHER PUBLICATIONS

International Search Report dated Apr. 21, 2008 with English translation (four (4) pages).

* cited by examiner

BACKREST FOR A VEHICLE SEAT WITH AN UPPER BACKREST HAVING ADJUSTABLE INCLINATION

CROSS-REFERENCE TO RELATED APPLICATIONS

This application is a continuation of PCT International Application No. PCT/EP2008/000242, filed Jan. 15, 2008, which claims priority under 35 U.S.C. §119 to German Patent Application No. DE 10 2007 004 767.5, filed Jan. 31, 2007, the entire disclosures of which are herein expressly incorporated by reference.

BACKGROUND AND SUMMARY OF THE INVENTION

The invention relates to a backrest for a vehicle seat with a backrest frame, which is surrounded by a cover and includes an upper backrest with an adjustable inclination.

The state of the art discloses backrests of this type in a variety of different embodiments. For example, DE 199 10 666 A1 discloses a vehicle seat, which has a seat section, a backrest and a headrest. The backrest is divided into two backrest sections, which can be pivoted about a horizontal axis in relation to each other. In this case, the upper backrest section bears a vertically adjustable headrest. The backrest, disclosed in DE 199 10 666 A1, is designed such that, during a rear end collision, the upper backrest section folds down in the forward direction against the lower backrest section. To this end, during a rear end collision the passenger, sitting on the vehicle seat, applies pressure to a mechanism in the lower region of the lower backrest section. The result of this action is that the upper backrest section along with the entire headrest, which is mounted thereon, is pivoted forwards. The drawback with this approach is that the cost of constructing such a design does not justify its use in the case of a seat with an integrated seat belt, where a seat belt D-ring is attached on the upper backrest section, because during a collision the passenger is pushed with enormous forces into the seat belt, and, hence these forces act on the pivot device between the upper and lower backrest section. In that case, the adjusting and locking devices between the upper and the lower backrest sections would have to be made very strong.

Another possibility that is disclosed in the state of the art for adjusting the inclination of the upper backrest section—thus, in the region of the shoulder blade—in relation to the lower backrest section is based on a totally different principle. In the case of such seats a single backrest frame is used that extends over both afore-mentioned regions of the backrest. Then the upper region of the backrest includes an inflatable body, which can be filled with air or can be deflated. In this way, the inclination of the upper backrest section is changed in relation to the lower backrest section as a function of how much air is present in the respective inflatable body. Since in this case a one-piece backrest frame is used, a seat belt D-ring can be fastened to this backrest frame, because there does not have to be a pivot axis, which is mechanically very stable, between the two sections of the frame. Therefore, such a construction can be used even in the case of a seat with an integrated seat belt. However, the drawback with this design is that it is very ineffective and slow. In addition, air conditioning functions in the vehicle seat can be realized only in partial areas thereof.

The object of the invention is to provide a backrest with an upper seat back with an adjustable inclination. This backrest withstands both high seat belt loads and can also be quickly adjusted. Moreover, it is not associated with a restriction on air conditioning functions.

This object is achieved with a backrest for a vehicle seat with a backrest frame, which is surrounded by a cover and includes an upper backrest having an adjustable inclination. An additional frame is hinged so as to be pivotable about a pivot axis on a side plate or to the cover or the backrest frame. The pivot axis is arranged in the upper region of the backrest, and the additional frame extends upwards from the pivot axis in the installed position of the backrest. The additional frame can be secured in different angular positions in relation to the backrest frame, and, thus, a variable gap forms between the additional cover of the additional frame and the cover of the backrest frame. Advantageous designs of the invention are described herein.

Owing to the fact that an additional frame is mounted on the otherwise continuous and one-piece backrest, in particular, a one-piece backrest frame, it is possible to also mount a seat belt D-ring on the backrest frame, which absorbs high seat belt forces. The pivotable hinge attachment of the additional frame on a side plate, the cover or the backrest frame can be carried out very easily, because it does not have to absorb any seat belt forces whatsoever. Owing to the fact that the additional frame can be secured in different angular positions relative to the backrest frame, good flexibility is guaranteed when a unique adjustment is made with respect to the current passenger. As a result, a variable gap forms between the additional cover of the additional frame and the cover of the backrest frame. In an extreme position, this gap can be reduced down to zero.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
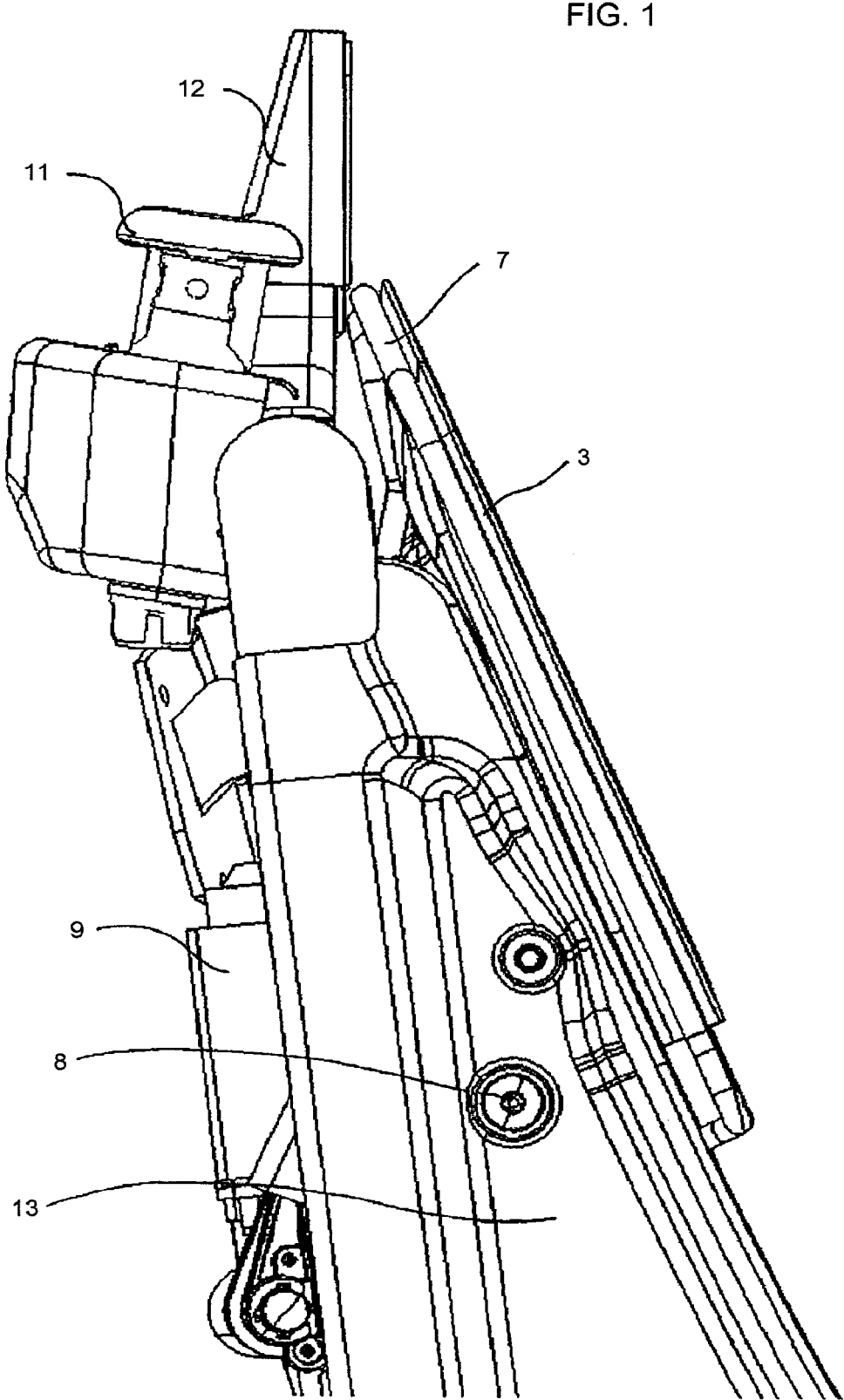
FIG. 1 is a side view of the upper section of a backrest having an adjustable inclination shown in a first extreme position.
Figure 2:
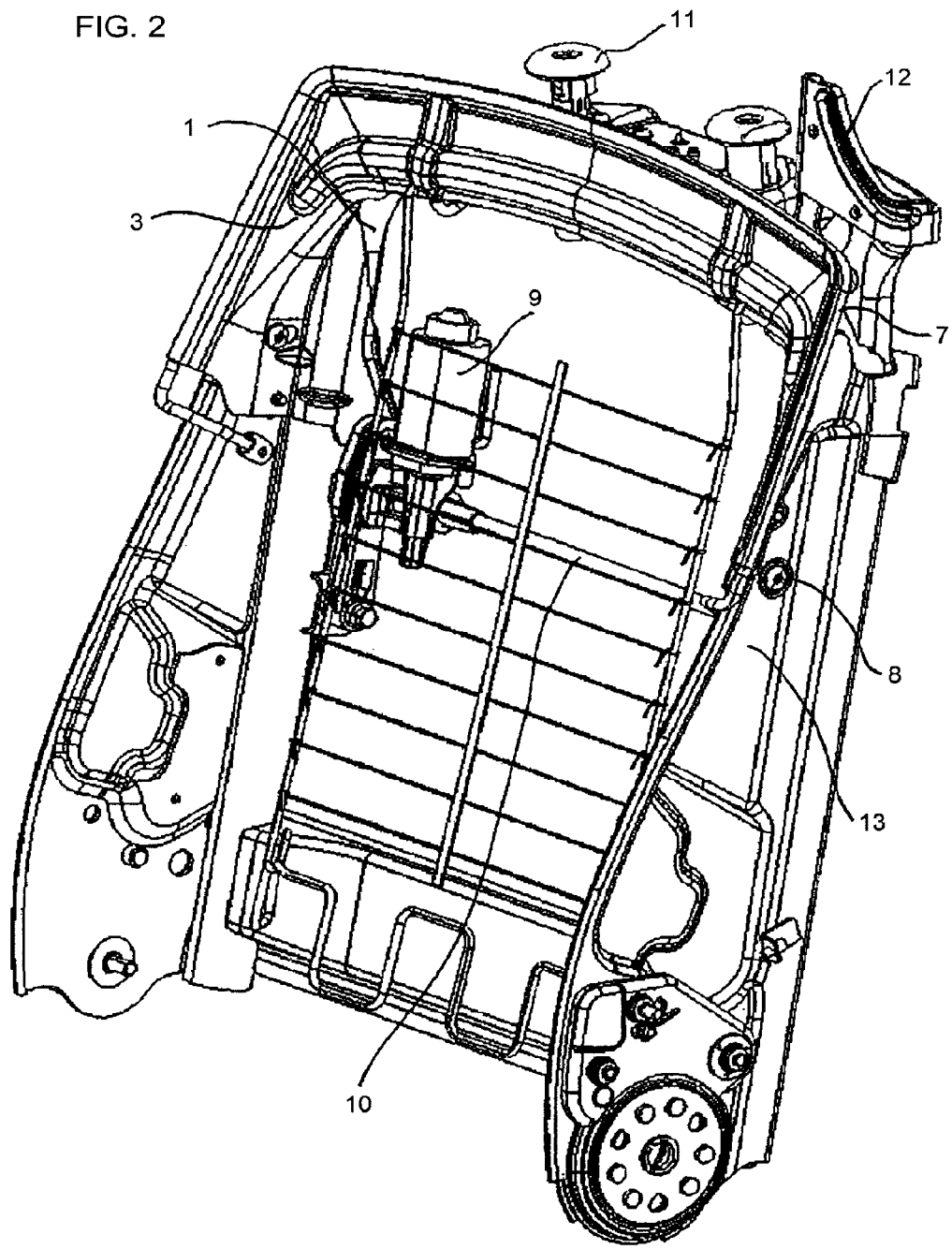
FIG. 2 is an oblique perspective view of the entire backrest, the upper backrest section having the adjustable inclination being located in the position shown in FIG. 1.

FIGS. 1 and 2 show one embodiment of a backrest according to the invention. In this context, FIG. 1 is an exploded detail from FIG. 2, wherein the viewing directions are different. In FIG. 1 it is a side view, and in FIG. 2 it is an oblique perspective view from the front. For the sake of a better overview, all of the cover sections and the headrest have been removed.

The illustrated backrest exhibits a conventional section, that is, a section that is known from the prior art. In this case, it is a continuous one-piece backrest frame 1, which has a tubular shape. It is just as readily possible to construct the backrest frame 1, for example, on the basis of extruded profiles or any other standard type of backrest frame 1. Both sides of the backrest frame 1 have side plates 13. The upper region of the backrest frame 1 includes a retaining mechanism for the headrest. The retaining mechanism has two headrest sleeves 11, into which the headrest (not illustrated) is slid from the top, and can be secured at different heights—as a function of the size of the occupant. In addition, a seat belt D-ring 12 is attached to one of the corners of the backrest frame 1 in the upper region. The result for both the headrest and the seat belt D-ring 12 is that they are connected securely to the one-piece backrest frame 1, which absorbs the forces during impact—that is, both the seat belt forces and the forces that the head of the occupant exerts on the headrest.

In addition to these known elements, the backrest according to an embodiment of the invention includes an additional frame 3. This additional frame 3 is connected to the backrest by way of a pivot axis 8. The pivot axis 8 is realized by means of two bearings—one each in each of the two side plates 13. The additional frame 3 is constructed essentially in the shape of a U, where the free ends of the "U" are connected to the pivot axis 8. In this context, the additional frame 3 is arranged such that it extends from the pivot axis 8 to the top. The pivot axis 8 is constructed so as to be in essence horizontal so that the additional frame 3 can be pivoted, like the known tilt adjustable upper backrest sections, in an ergonomic manner totally in the region of the shoulder blade.

Not only the additional frame 3, but also the supporting and/or fastening elements, which are rigidly connected to the additional frame 3, are shown. These supporting and/or fastening elements produce a connection to the padding of the backrest (not illustrated) to which a cover 6 (see FIG. 5) is also fastened.

The pivot motion of the additional frame 3 in relation to the backrest frame 1 is achieved by way of a motor 9, which is mounted inside the backrest. To this end, a stepper motor is used, for example. However, any other type of motor can also be used. The motor is connected to the two hinges of the pivot axis 8 by a transfer axle 10 and drives both sides—thus, the free ends of the "U" of the additional frame 3.

FIGS. 1 and 2 show a first extreme position of the additional frame 3 in relation to the backrest frame 1. In this case, the additional frame 3 is moved as close as possible to the backrest frame 1. A support bracket 7 is connected to the backrest frame 1. The function of this support bracket 7 is described in detail in connection with FIGS. 3 to 5.

The motor 9 is connected to a remotely located control unit (not illustrated) by a line (not illustrated). The control unit can be mounted on a seat member (not illustrated) of the vehicle seat, which seat continues below the backrest. At such a location, most vehicle seats exhibit all of the control knobs for all possible motions of the backrest—for example, pivoting the entire backrest at its hinge between it and the seat member or also adjusting the seat cushion depth or the seat cushion height, etc. It is just as easily possible to control the motor 9 from a different position in the vehicle, for example, from the dashboard or a switch on the steering wheel. It is also contemplated that the motor 9 is not connected by a line to the remotely located control device, but rather receives control signals via a cable-free connection.

Figure 3:
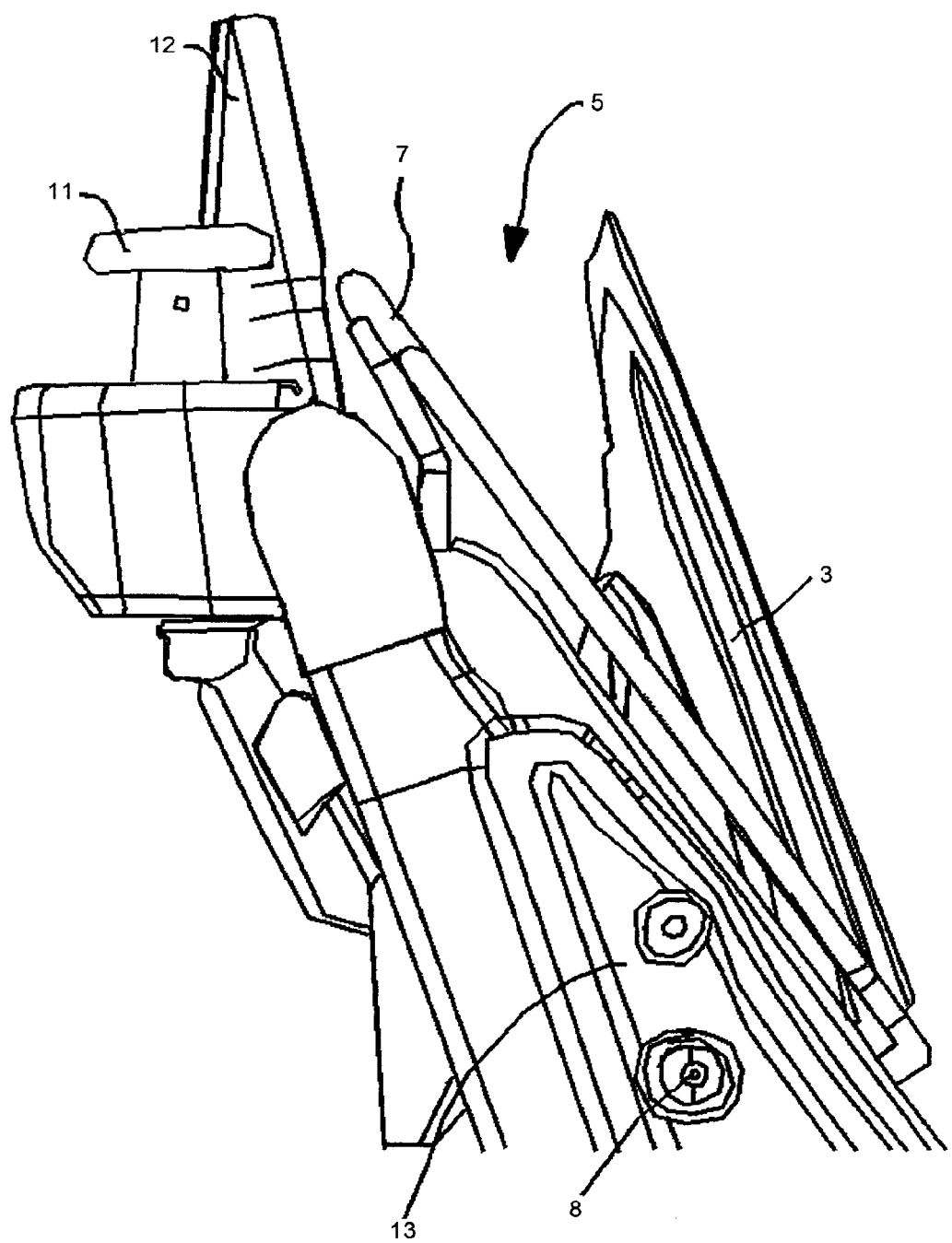
FIG. 3 is a side view of the upper section of the backrest, as shown in FIG. 1, wherein the upper backrest section having the adjustable inclination is shown in its second extreme position.
Figure 4:
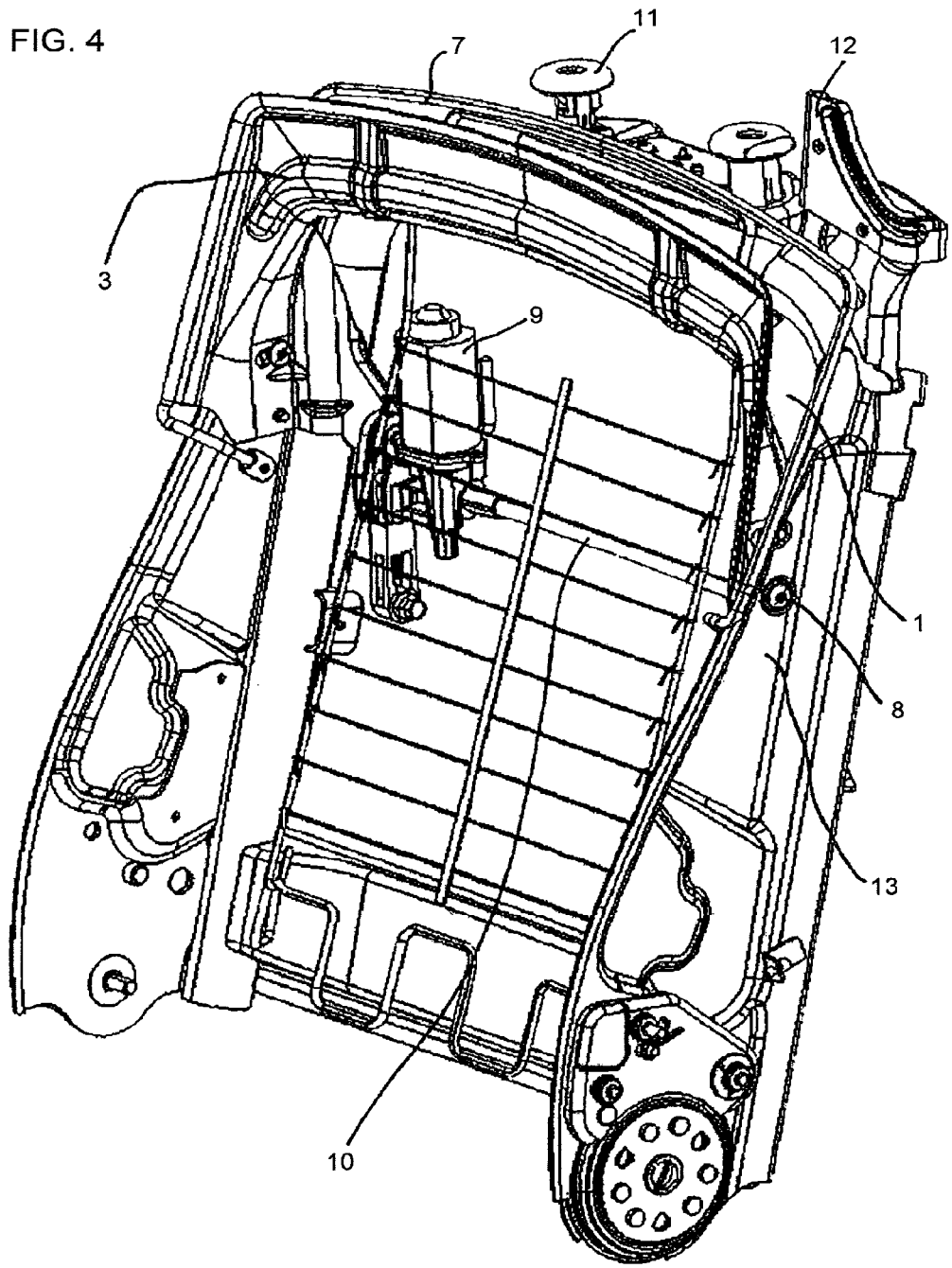
FIG. 4 is an oblique perspective view of the entire backrest, as shown in FIG. 2, in this case, however, with the upper backrest section having the adjustable inclination in its second extreme position, as shown in FIG. 3.

In principle, the drawings in FIGS. 3 and 4 match the drawings in FIGS. 1 and 2 (both with respect to the viewing angle and the illustrated elements). The main distinction between FIGS. 1 and 2 lies in the fact that the additional frame 3 is shown in its second extreme position in relation to the backrest frame 1.

The additional frame 3 was moved from its first extreme position, which is shown in FIGS. 1 and 2, into its second extreme position, which is shown in FIGS. 3 and 4, by way of the transfer axle 10. The transfer axle 10 was driven by the motor 9. Since in this case it concerns a common movement of a device, which is mounted rotationally in a hinge, it is not described in detail how this movement takes place.

When the additional frame 3 moves from its first extreme position (FIGS. 1 and 2) into its second extreme position (FIGS. 3 and 4), a gap 5 opens between the backrest frame 1, which is stationary, and the additional frame 3, which is pivoted. This gap 5 has to be covered at all times, on the one hand, for aesthetic reasons and, on the other hand, for safety reasons, because otherwise there would be concern about body parts or foreign objects getting wedged in between.

Figure 5:
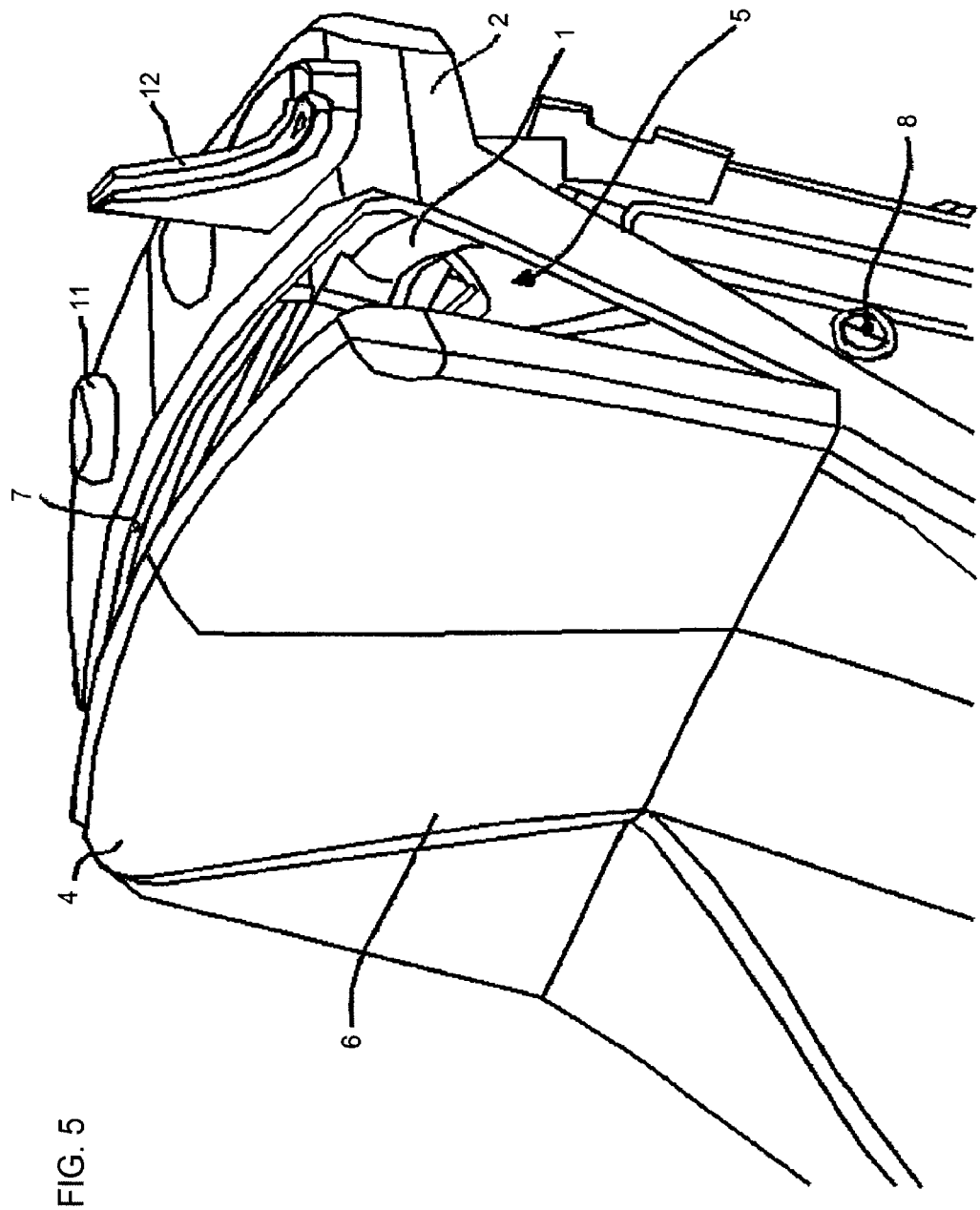
FIG. 5 is an enlarged view of the backrest in the region of the upper backrest section having the adjustable inclination, as shown in FIG. 4, but with covers.

For an explanation as to how this problem is solved, reference is also made to FIG. 5, which shows the backrest from the perspective and position of the additional frame 3 in FIG. 4. In contrast to FIG. 4, however, in this case only a detail of the upper region of the backrest, thus, in the region in which the shoulder blades of the occupant make contact, is shown. In addition, a cover 2 is affixed to the backrest frame 1. An additional cover 4 is affixed to the additional frame 3. A cover 6 of the backrest is connected to the additional cover 4.

In order to span the gap 5, a cover patch is used. This cover patch is not shown in any of FIGS. 1 to 5. It is connected rigidly to the additional cover 4 of the additional frame 3. Thus, when the additional frame 3 is pivoted, its attachment surface also moves in relation to the cover 2 of the backrest frame 1. In order to compensate for the varying width of the gap 5, the cover patch is guided over the wire clamp 7, which is shown in all five figures. To this end, a narrow passage, exhibiting at least exactly the thickness of the cover patch, is formed between this wire clamp 7 and the cover 2 of the backrest frame 1.

The cover patch is routed over the wire clamp 7 and stretched, for example, with elastic bands. As an alternative, any other possible means for generating a force can also be used. The elastic bands are connected, on the one hand, to the cover patch and, on the other hand, to the stationary member of the backrest, thus, for example to the side plates 13, the cover 2, or the like. The tensile force of the elastic bands causes the cover patch to remain under constant tension, irrespective of the current position of the additional frame 3 in relation to the backrest frame 1—a state that means that the size of the gap 5 may vary from time-to-time and, thus, the gap 5 is always covered with a smooth surface. This is necessary, on the one hand, for aesthetic reasons, and, on the other hand, it is a prerequisite for the condition that upon closing the gap 5, no body parts can be pinched. In principle, such a routing and tensioning process of the cover patch is known from the prior art, so that there is no need to go into the details at this point. A suitable cover patch may be, for example, both a piece of leather or even cloth.

Considering the drawing in FIG. 5 and how the gap 5 will be slowly closed by pivoting the additional frame 3 together with the entire additional cover 4, then an aesthetic impression is obtained of the fully closed state of the gap 5 wherein it is a one-piece composite cover (composed of the cover 2 and the additional cover 4). In addition, it is guaranteed in such a state that no part of the body can squeeze between the cover 2 and the additional cover 4.

In summary, owing to the use of an additional frame 3, a decoupling of the inclination adjustment of the upper backrest from the forces—for example, the seat belt forces—acting on the backrest frame 1 is achieved. As a result, very simple and economical hinges can be used for the construction of the pivot axis 8. Even the motor 9 for driving the pivot axis 8 can be constructed very simply and inexpensively. A backrest that is constructed accordingly can also be quickly adjusted.

In this context, it is also possible at the same time to integrate an air conditioning apparatus for a ventilated seat. Finally, the use of the cover patch, which is held under constant tension, guarantees that both an aesthetic unity in any position of the additional frame 3 is provided and the pinching of any body parts in the closing gap 5 is prevented.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A backrest for a vehicle seat having an upper backrest with an adjustable inclination, the backrest comprising:
 a backrest frame carrying a headrest;
 a first cover operatively configured to cover the backrest frame;
 an additional frame operatively hinged to be pivotable about a pivot axis on one of the backrest frame, the first cover, and side plates of the backrest frame, the pivot axis being arranged in an upper region of the backrest such that the additional frame extends upwards from the pivot axis in an installed position of the backrest;
 an additional cover operatively configured to cover the additional frame; and
 wherein the additional frame is pivotable about the pivot axis into different angular positions in relation to the backrest frame without changing a position of the headrest, a variably-sized gap thereby forming between the additional cover of the additional frame and the first cover of the backrest frame.

2. The backrest according to claim 1, wherein in an installed position of the backrest, the pivot axis extends substantially horizontally.

3. The backrest according claim 2, further comprising:
 a motor mounted in the backrest, the motor being operatively configured to pivot the additional frame about the pivot axis; and
 a control unit arranged remotely from the motor and being configured to control the motor.

4. The backrest according to claim 2, further comprising:
 a cover patch adaptable to cover the variably-sized gap between the additional cover of the additional frame and the first cover of the backrest frame.

5. The backrest according to claim 2, wherein the additional frame is mounted so as to be located in a user's shoulder blade region.

6. The backrest according claim 1, further comprising:
 a motor mounted in the backrest, the motor operatively configured to pivot the additional frame about the pivot axis; and
 a control unit arranged remotely from the motor and being configured to control the motor.

7. The backrest according to claim 6, further comprising:
 a cover patch adaptable to cover the variably-sized gap between the additional cover of the additional frame and the first cover of the backrest frame.

8. The backrest according to claim 7, wherein the cover patch is connected rigidly to the additional cover of the additional frame and, via an elastic device secured to the backrest, is in a continuously stretched state irrespective of an angular position between the additional frame and the backrest frame.

9. The backrest according to claim 7, further comprising a seat belt D-ring secured to the backrest frame.

10. The backrest according to claim 6, wherein the additional frame is mounted so as to be located in a user's shoulder blade region.

11. The backrest according to claim 1, further comprising:
 a cover patch adaptable to cover the variably-sized gap between the additional cover of the additional frame and the first cover of the backrest frame.

12. The backrest according to claim 11, wherein the cover patch is connected rigidly to the additional cover of the additional frame and, via an elastic device secured to the backrest, is in a continuously stretched state irrespective of an angular position between the additional frame and the backrest frame.

13. The backrest according to claim 12, further comprising a wire clamp connected to the backrest, wherein the cover patch extends over the wire clamp.

14. The backrest according to claim 13, wherein the wire clamp is connected to the first cover of the backrest frame.

15. The backrest according to claim 12, wherein when the variably-sized gap is fully closed, the additional cover and the first cover are configured to be essentially in alignment with one other.

16. The backrest according to claim 1, wherein when the variably-sized gap is fully closed, the additional cover and the first cover are configured to be essentially in alignment with one other.

17. The backrest according to claim 1, further comprising a seat belt D-ring secured to the backrest frame.

18. The backrest according to claim 1, wherein the additional frame is mounted so as to be located in a user's shoulder blade region.

\* \* \* \* \*